United States Patent
Andoor Veettil et al.

(10) Patent No.: US 11,630,846 B2
(45) Date of Patent: Apr. 18, 2023

(54) DATA MIGRATION PLANNING AND SCHEDULING BASED ON DATA CHANGE RATE ANALYSIS

(71) Applicant: Kyndryl, Inc., New York, NY (US)

(72) Inventors: Hareesh Andoor Veettil, Bengaluru (IN); Kumar Saurabh, Bengaluru (IN)

(73) Assignee: Kyndryl, Inc., New York, NY (US)

( * ) Notice: Subject to any disclaimer, the term of this patent is extended or adjusted under 35 U.S.C. 154(b) by 256 days.

(21) Appl. No.: 17/158,215

(22) Filed: Jan. 26, 2021

(65) Prior Publication Data

US 2022/0237206 A1 Jul. 28, 2022

(51) Int. Cl.
| | |
|---|---|
| G06F 7/00 | (2006.01) |
| G06F 17/00 | (2019.01) |
| G06F 16/27 | (2019.01) |
| G06F 9/50 | (2006.01) |
| G06F 11/30 | (2006.01) |
| G06F 16/23 | (2019.01) |

(52) U.S. Cl.
CPC ............ G06F 16/275 (2019.01); G06F 9/505 (2013.01); G06F 11/3034 (2013.01); G06F 16/2308 (2019.01)

(58) Field of Classification Search
None
See application file for complete search history.

(56) References Cited

U.S. PATENT DOCUMENTS

| | | | |
|---|---|---|---|
| 8,826,272 B2 | 9/2014 | Glikson et al. | |
| 9,141,919 B2 * | 9/2015 | Athey | ............... G06F 16/214 |
| 9,430,506 B2 | 8/2016 | Schuenzel et al. | |
| 2019/0171979 A1 | 6/2019 | Devarakonda et al. | |
| 2019/0182323 A1 | 6/2019 | Srinivasan et al. | |
| 2019/0384634 A1 | 12/2019 | Nanduru et al. | |
| 2020/0004582 A1 * | 1/2020 | Fornash | ............... G06F 9/4856 |
| 2020/0104375 A1 * | 4/2020 | Earnesty, Jr. | ......... G06F 16/214 |

OTHER PUBLICATIONS

Anonymous, "Cognitive Migration of workload to Hybrid Cloud," An IP.com Prior Art Database Technical Disclosure, IPCOM000254733D, Jul. 26, 2018, 6 pages. https://priorart.ip.com/IPCOM/000254733.

(Continued)

*Primary Examiner* — Tuan A Pham

(74) *Attorney, Agent, or Firm* — VanLeeuwen & VanLeeuwen; Daniel C. Housley

(57) ABSTRACT

Data migration based on data change rate analysis is provided. A minimum data replication duration is calculated for each respective data migration event of a set of data migration events in an existing data migration wave plan by adjusting a planned data replication duration until a data change rate per day of servers is equal to an estimated server data replication rate per day when the existing data migration wave plan is not feasible. A new data replication start date, a new data replication end date, and a new data migration cutover date is determined for each respective data migration event based on the minimum data replication duration for each respective data migration event. A new data migration wave plan is generated based on the new data replication start date, the new data replication end date, and the new data migration cutover date for each respective data migration event.

20 Claims, 7 Drawing Sheets

(56) References Cited

OTHER PUBLICATIONS

Gansler, "Data Center Migration and Consolidation Planning," AssetPoint, LLC., Align Communications, Inc., 3 pages. http://www.asset-point.com/docs/AssetPoint_WP_Data_Center_Migration.pdf.
Ellison et al., "Evaluating cloud database migration options using workload models," Journal of Cloud Computing: Advances, Systems and Applications, Mar. 2018, 18 pages.
Anonymous, "Smart Storage Migration Planning for the Hybrid Cloud," An IP.com Prior Art Database Technical Disclosure, IPCOM000261229D, Feb. 12, 2020, 6 pages. https://priorart.ip.com/IPCOM/000261229.
Mell et al., "The NIST Definition of Cloud Computing," Computer Security Division, National Institute of Standards and Technology, Jan. 2011, 7 pages.

* cited by examiner

DATA MIGRATION PLANNING AND SCHEDULING BASED ON DATA CHANGE RATE ANALYSIS

BACKGROUND

1. Field

The disclosure relates generally to data migration and more specifically to data migration planning and scheduling based on analyzing the data change rate of each respective server in a set of servers corresponding to a data migration event of a set of data migration events in an entire data migration wave plan of a data migration project.

2. Description of the Related Art

Data migration is the process of transferring data from one storage system or computing environment to another. Many reasons exist for an entity, such as, for example, an enterprise, business, company, organization, institution, agency, or the like, to undertake a data migration project. For example, the entity may be replacing servers or storage devices, consolidating, or decommissioning a data center, preparing for disaster recovery, and the like. Data migration is also a step in an overall process of migrating on-premises IT infrastructure to a cloud computing environment, such as, for example, a public cloud, private cloud, hybrid cloud, or community cloud environment.

Data migration is usually performed programmatically to achieve an automated data migration, freeing up human resources from tedious tasks. Programmatic data migration may involve many phases, but it minimally includes data replication where data is read from the old system or environment and data migration where data is moved to the new system or environment. After loading into the new system or environment, results are subjected to data verification to determine whether data was accurately translated, is complete, and supports processes in the new system or environment.

SUMMARY

According to one illustrative embodiment, a computer-implemented method for data migration based on data change rate analysis is provided. A computer calculates a minimum data replication duration for each respective data migration event of a set of data migration events in an existing data migration wave plan of a data migration project by adjusting a planned data replication duration until a data change rate per day of servers is equal to an estimated server data replication rate per day when the existing data migration wave plan is not feasible. The computer determines a new data replication start date, a new data replication end date, and a new data migration cutover date for each respective data migration event of the set of data migration events based on the minimum data replication duration calculated for each respective data migration event so that one or more data migration events in the set of data migration events are scheduled concurrently to decrease data migration time for the data migration project. The computer generates a new data migration wave plan based on the new data replication start date, the new data replication end date, and the new data migration cutover date for each respective data migration event of the set of data migration events corresponding to the data migration project. According to other illustrative embodiments, a computer system and computer program product for data migration based on data change rate analysis are provided.

DETAILED DESCRIPTION

Figure 1:
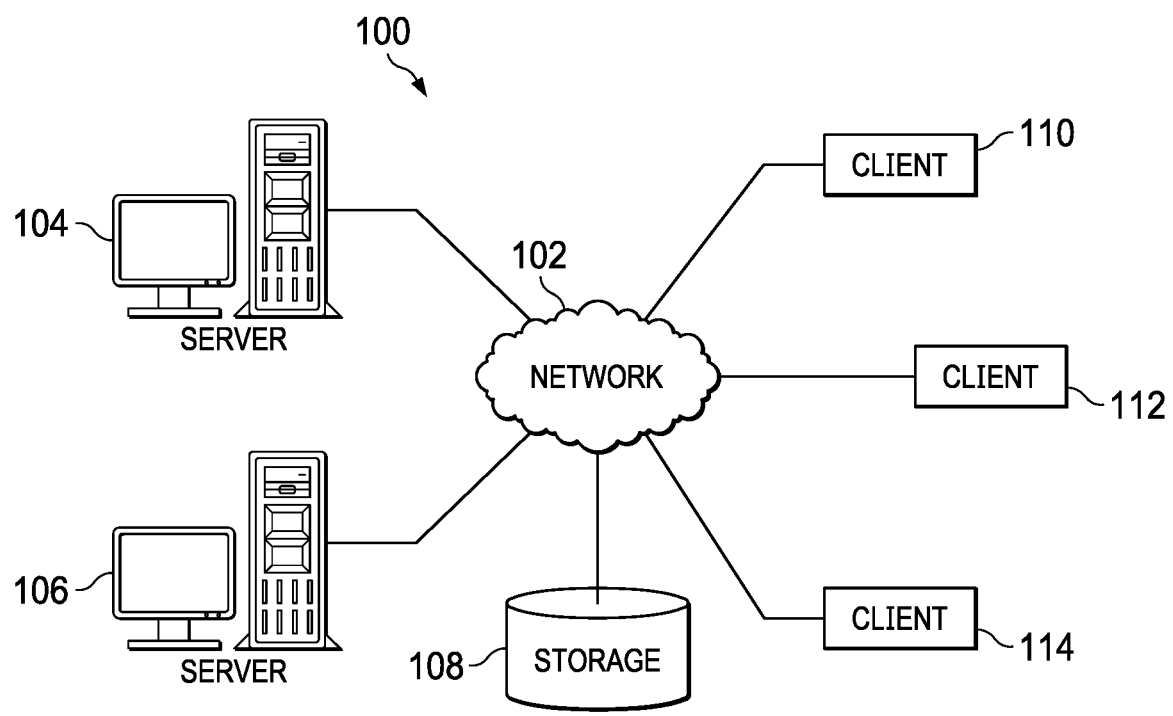
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, fiber optic cables, and the like.

In the depicted example, server 104 and server 106 connect to network 102, along with storage 108. Server 104 and server 106 may be, for example, server computers with high-speed connections to network 102. In addition, server 104 and server 106 provide data migration planning and scheduling services for subscribing customer entities, such as, for example, enterprises, businesses, companies, organizations, institutions, agencies, and the like. Also, it should be noted that server 104 and server 106 may each represent multiple computing nodes in one or more cloud environments. Alternatively, server 104 and server 106 may each represent a cluster of servers in one or more data centers.

Client 110, client 112, and client 114 also connect to network 102. Clients 110, 112, and 114 are client devices of server 104 and server 106. Further, each of clients 110, 112, and 114 may represent a plurality of computing devices (e.g., server computers, storage devices, and the like) in a computing environment, such as a data center or cloud, operated by one or more customer entities.

As an illustrative example, client 110 may represent a plurality of computing devices located in a data center operated by a customer entity and client 112 may represent another plurality of computing devices located in another data center operated by that same customer entity. In response to receiving a request from that customer entity to migrate data from the plurality of computing devices located in the data center represented by client 110 to the other plurality of computing devices located in the data center represented by client 112, server 104 plans and schedules migration of the data from the plurality of computing devices located in the data center represented by client 110 to the other plurality of computing devices located in the data center represented by client 112.

As another illustrative example, client 110 may represent a plurality of computing devices located in a data center operated by that same customer entity and client 114 may represent another plurality of computing devices located in a cloud environment (e.g., a public, private, hybrid, or community cloud) operated by that customer entity. In response to receiving a request from that customer entity to migrate data from the plurality of computing devices located in the data center represented by client 110 to the other plurality of computing devices located in the cloud environment represented by client 114, server 106 plans and schedules the migration of the data from the plurality of computing devices located in the data center represented by client 110 to the other plurality of computing devices located in the cloud environment represented by client 114.

Storage 108 is a network storage device capable of storing any type of data in a structured format or an unstructured format. In addition, storage 108 may represent a plurality of network storage devices. Further, storage 108 may store identifiers and network addresses for a plurality of different computing devices corresponding to different customer entities, customer entity identifiers, customer entity data (e.g., identification of customer environments, networks, data migration links, storage capacity of computing devices, data to be migrated, existing data migration wave plans, and the like). Furthermore, storage 108 may store other types of data, such as authentication or credential data that may include user names, passwords, and biometric data associated with users, such as, for example, system administrators, security analysts, and the like.

In addition, it should be noted that network data processing system 100 may include any number of additional servers, clients, storage devices, and other devices not shown. Program code located in network data processing system 100 may be stored on a computer readable storage medium or a set of computer readable storage media and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a wide area network (WAN), a local area network (LAN), a telecommunications network, or any combination thereof. FIG. 1 is intended as an example only, and not as an architectural limitation for the different illustrative embodiments.

As used herein, when used with reference to items, "a number of" means one or more of the items. For example, "a number of different types of communication networks" is one or more different types of communication networks. Similarly, "a set of," when used with reference to items, means one or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Figure 2:
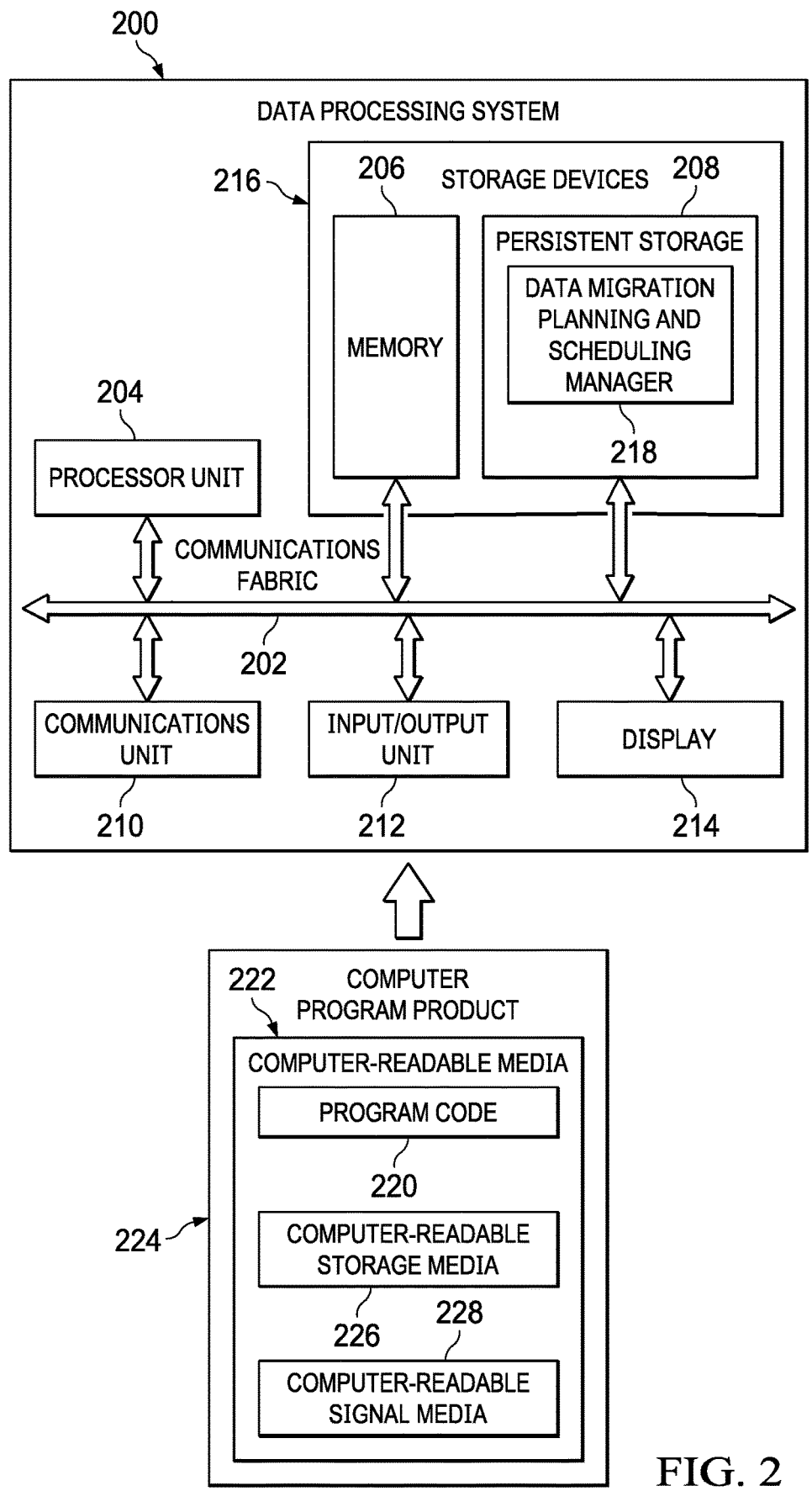
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing the data migration planning and scheduling processes of illustrative embodiments may be located. In this example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. As used herein, a computer readable storage device or a computer readable storage medium is any piece of hardware that is capable of storing information, such as, for example, without limitation, data, computer readable program code in functional form, and/or other suitable information either on a transient basis or a persistent basis. Further, a computer readable storage device or a computer readable storage medium excludes a propagation medium, such as transitory signals. Furthermore, a computer readable storage device or a computer readable storage medium may represent a set of computer readable storage devices or a set of computer readable storage media. Memory 206, in these examples, may be, for example, a random-access memory (RAM), or any other suitable volatile or non-volatile storage device, such as a flash memory. Persistent storage 208 may take various forms, depending on the particular implementation. For example, persistent storage 208 may contain one or more devices. For example, persistent storage 208 may be a disk drive, a solid-state drive, a rewritable optical disk, a rewritable magnetic tape, or some combination of the above. The media used by persistent storage 208 may be removable. For example, a removable hard drive may be used for persistent storage 208.

In this example, persistent storage 208 stores data migration planning and scheduling manager 218. However, it should be noted that even though data migration planning and scheduling manager 218 is illustrated as residing in persistent storage 208, in an alternative illustrative embodiment data migration planning and scheduling manager 218 may be a separate component of data processing system 200. For example, data migration planning and scheduling manager 218 may be a hardware component coupled to communication fabric 202 or a combination of hardware and software components. In another alternative illustrative embodiment, a first set of components of data migration planning and scheduling manager 218 may be located in data processing system 200 and a second set of components of data migration planning and scheduling manager 218 may be located in a second data processing system, such as, for example, server 106 in FIG. 1.

Data migration planning and scheduling manager 218 controls the process of planning and scheduling migration of data from a set of servers in one computing environment (e.g., a private cloud) to another set of servers in another computing environment (e.g., a community cloud) based on analyzing the data change rate of each respective server in the set of servers having the data migrated from in order to accurately calculate the estimated data replication duration for the data migration project and feasibility of the data migration plan. As a result, data processing system 200 operates as a special purpose computer system in which data migration planning and scheduling manager 218 in data processing system 200 enables increased accuracy in estimating data replication duration for a data migration project and data migration plan feasibility. In particular, data migration planning and scheduling manager 218 transforms data processing system 200 into a special purpose computer system as compared to currently available general computer systems that do not have data migration planning and scheduling manager 218.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultrahigh frequency, microwave, wireless fidelity (Wi-Fi), Bluetooth© technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 220 is located in a functional form on computer readable media 222 that is selectively removable and may be loaded onto or transferred to data processing system 200 for running by processor unit 204. Program code 220 and computer readable media 222 form computer program product 224. In one example, computer readable media 222 may be computer readable storage media 226 or computer readable signal media 228.

In these illustrative examples, computer readable storage media 226 is a physical or tangible storage device used to store program code 220 rather than a medium that propagates or transmits program code 220. Computer readable storage media 226 may include, for example, an optical or magnetic disc that is inserted or placed into a drive or other device that is part of persistent storage 208 for transfer onto a storage device, such as a hard drive, that is part of persistent storage 208. Computer readable storage media 226 also may take the form of a persistent storage, such as a hard drive, a thumb drive, or a flash memory that is connected to data processing system 200.

Alternatively, program code 220 may be transferred to data processing system 200 using computer readable signal media 228. Computer readable signal media 228 may be, for example, a propagated data signal containing program code 220. For example, computer readable signal media 228 may be an electromagnetic signal, an optical signal, or any other suitable type of signal. These signals may be transmitted over communication links, such as wireless communication links, an optical fiber cable, a coaxial cable, a wire, or any other suitable type of communications link.

Further, as used herein, "computer readable media 222" can be singular or plural. For example, program code 220 can be located in computer readable media 222 in the form of a single storage device or system. In another example, program code 220 can be located in computer readable media 222 that is distributed in multiple data processing systems. In other words, some instructions in program code 220 can be located in one data processing system while other instructions in program code 220 can be located in one or more other data processing systems. For example, a portion of program code 220 can be located in computer readable media 222 in a server computer while another portion of program code 220 can be located in computer readable media 222 located in a set of client computers.

The different components illustrated for data processing system 200 are not meant to provide architectural limitations to the manner in which different embodiments can be implemented. In some illustrative examples, one or more of the components may be incorporated in or otherwise form a portion of, another component. For example, memory 206, or portions thereof, may be incorporated in processor unit 204 in some illustrative examples. The different illustrative embodiments can be implemented in a data processing system including components in addition to or in place of those illustrated for data processing system 200. Other components shown in FIG. 2 can be varied from the illustrative examples shown. The different embodiments can be implemented using any hardware device or system capable of running program code 220.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system.

It is understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the service's provider. Broad network access provides for capabilities that are available over a network and accessed through standard mechanisms that promote use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

Figure 3:
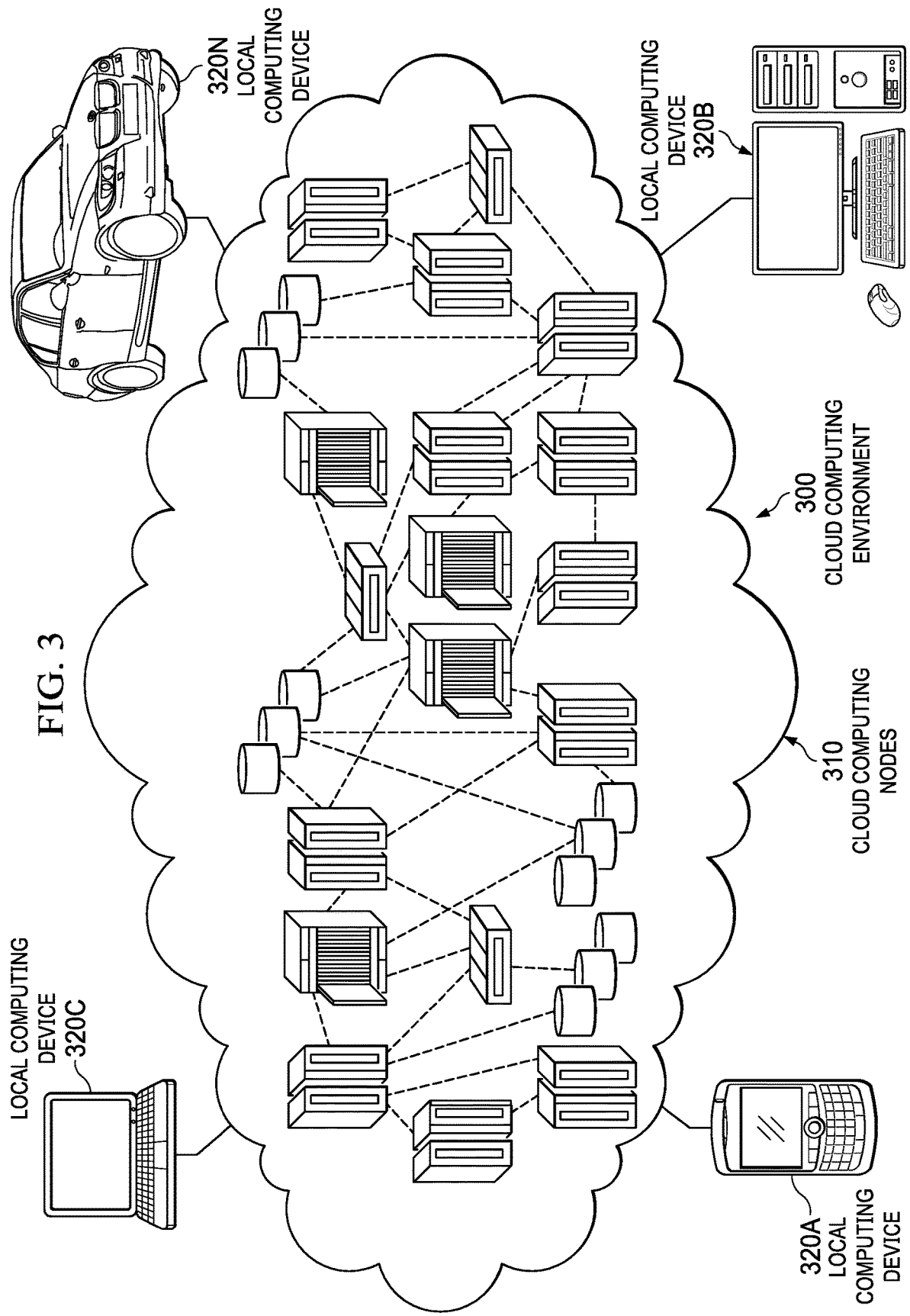
FIG. 3 is a diagram illustrating a cloud computing environment in which illustrative embodiments may be implemented.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local computing devices used by cloud consumers, such as, for example, personal digital assistant or smart phone 320A, desktop computer 320B, laptop computer 320C, and/or automobile computer system 320N, may communicate. Cloud computing nodes 310 may be, for example, server 104 and server 106 in FIG. 1. Local computing devices 320A-320N may be, for example, clients 110-114 in FIG. 1.

Cloud computing nodes 310 may communicate with one another and may be grouped physically or virtually into one or more networks, such as private, community, public, or hybrid clouds as described hereinabove, or a combination thereof. This allows cloud computing environment 300 to offer infrastructure, platforms, and/or software as services for which a cloud consumer does not need to maintain resources on a local computing device, such as local computing devices 320A-320N. It is understood that the types of local computing devices 320A-320N are intended to be illustrative only and that cloud computing nodes 310 and cloud computing environment 300 can communicate with any type of computerized device over any type of network and/or network addressable connection using a web browser, for example.

Figure 4:
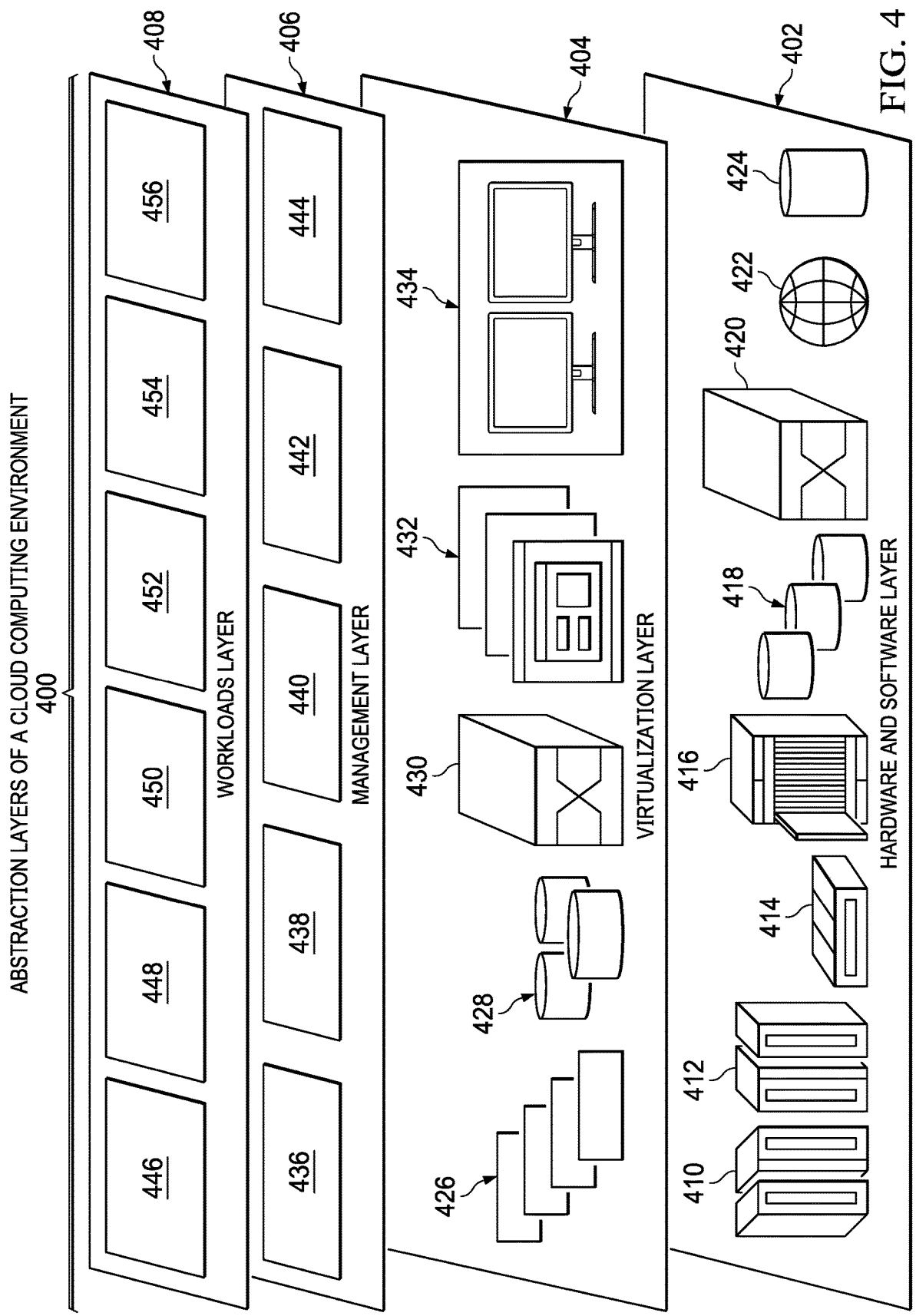
FIG. 4 is a diagram illustrating an example of abstraction layers of a cloud computing environment in accordance with an illustrative embodiment.

With reference now to FIG. 4, a diagram illustrating abstraction model layers is depicted in accordance with an illustrative embodiment. The set of functional abstraction layers shown in this illustrative example may be provided by a cloud computing environment, such as cloud computing environment 300 in FIG. 3. It should be understood in advance that the components, layers, and functions shown in FIG. 4 are intended to be illustrative only and embodiments of the invention are not limited thereto. As depicted, the following layers and corresponding functions are provided.

Abstraction layers of a cloud computing environment 400 include hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430, including virtual private networks; virtual applications and operating systems 432; and virtual clients 434.

In one example, management layer 406 may provide the functions described below. Resource provisioning 436 provides dynamic procurement of computing resources and other resources, which are utilized to perform tasks within the cloud computing environment. Metering and pricing 438 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 440 provides access to the cloud computing environment for consumers and system administrators. Service level management 442 provides cloud computing resource allocation and management such that required service levels are met. Service level agreement (SLA) planning and fulfillment 444 provides pre-arrangement for, and procurement of, cloud computing resources for which a future requirement is anticipated in accordance with an SLA.

Workloads layer 408 provides examples of functionality for which the cloud computing environment may be utilized. Example workloads and functions, which may be provided by workload layer 408, may include mapping and navigation 446, software development and lifecycle management 448, virtual classroom education delivery 450, data analytics processing 452, transaction processing 454, and data migration planning and scheduling management 456.

Currently, many data migration projects are over time, over budget, or fail entirely. As a result, to achieve an effective data migration, proper planning is needed. While specifics of a data migration plan may vary from project to project, typically three main phases exist in any data migration project: planning, scheduling, and migration.

Current data migration wave plans are created based on several factors, such as, for example, application dependencies (e.g., affinities between server workloads), migration criticality, maximum number of data or server images to migrate per migration event in a project, and customer environment (e.g., development environment, test environment, production environment, or the like). However, current data migration planning tools do not take into account data change rate of the servers being migrated from while determining the data migration wave plan. Data change rate can vary significantly by individual server workload. In addition, data change rate can dramatically affect the amount of time needed for data replication in support of migration cutover and the amount of time needed for data replication between data migration cutover events.

Once servers are bundled for data migration, current data migration planning tools calculate data replication duration based on previous data migration experience using similar data migration link bandwidth between servers or, at a high level, based on the data storage capacity of the servers and bandwidth of the data migration link. Based on this calculation, current data migration planning tools schedule data migration events for specific dates (i.e., data migration wave plan based on a data replication duration calculation, which is server storage capacity/data replication rate per day). Another approach is adding a few extra days to the data replication duration calculation as a buffer when the data replication process did not finish as scheduled. These approaches have issues because an application running a workload on a server can have a significant or substantial data change rate, which can potentially cause postponing a migration event as the data replication duration will be extended. For example, a data migration wave plan based on the data replication duration calculation for a migration event with an added buffer of time will be server storage capacity/data replication rate per day plus a number of added days (e.g., double the number of days) as the time buffer.

This suboptimal migration planning by current data migration planning tools causes delays in completion of data replication for scheduled data migration cutover dates and some data migration events may be postponed to another date, which causes waste of effort, increases data migration cost, and decreases customer satisfaction. Further, incorrect estimation of the time needed for data replication also causes delay in the entire migration project timeline.

Illustrative embodiments perform a data change rate analysis of each respective server of a set of servers corresponding to a data migration event in a set of data migration events of a data migration wave plan to address the above issues with current data migration planning tools. Illustrative embodiments can estimate the entire data migration project duration at the beginning of the planning stage, itself. In addition, illustrative embodiments can efficiently plan data replication start date, data replication finish date, and data migration cutover date for each data migration event in the data migration wave plan. Further, illustrative embodiments can be used for the entire duration of the data migration project.

Illustrative embodiments analyze the data change rate of each individual server to plan and schedule the data migration for a datacenter or cloud environment of a customer. The data migration project may be, for example, a datacenter-to-datacenter data migration project, a datacenter-to-cloud data migration project, a cloud-to-cloud data migration project, or the like. Illustrative embodiments generate new data migration wave plans by calculating the minimum data replication duration for each respective data migration event in a data migration wave plan. Illustrative embodiments calculate the minimum data replication duration for each respective data migration event in the set of data migration events to determine the overall data migration duration and the duration of the entire data migration project.

Illustrative embodiments also validate (i.e., determine feasibility of) existing data migration wave plans generated by current data migration planning tools by taking into account the server storage capacity needed for the data or server images to be migrated. Further, illustrative embodiments take into account data change rates of individual server workloads and bandwidth availability of data migration links between source and target servers to calculate the duration between data migration events or waves. For example, the data migration wave planning of illustrative embodiments using the calculation of data replication duration for data migration events is based on calculating the minimum data replication duration using the data change rate corresponding to the workload of each respective server involved in that particular data migration event. Illustrative embodiments determine the data migration wave plan by ordering data migration events concurrently when possible by calculating the minimum data replication duration of each respective data migration event in the set of data migration events in the data migration wave plan. This ensures effective bandwidth utilization of the data migration link between source and target servers.

Illustrative embodiments calculate the estimated data replication rate per day based on, for example, data migration link speed ($L_S$) between servers in gigabits per second (Gb/s), data migration link efficiency ($L_E$) in percentage, available bandwidth ($A_B$) for data migration after bandwidth throttling in megabytes per second (MB/s), and data compression ratio (e.g., 2:1 data compression ratio). Illustrative embodiments first calculate the effective bandwidth ($E_B$) for data migration using the following equation:

$$(E_B)=(L_S/8)/1024 \times L_E,$$

where $L_S/8$ converts bits to bytes (i.e., 8 bits equal one byte), divided by 1024 to convert gigabytes (GB) to megabytes (MB) and multiplied by $L_E$ (i.e., the migration link percent efficiency) to calculate the effective bandwidth ($E_B$). Illustrative embodiments utilize the effective bandwidth ($E_B$) as the available bandwidth ($A_B$) when no data migration link bandwidth throttling exists. However, when data migration link bandwidth throttling exists, illustrative embodiments utilize the available bandwidth ($A_B$) for data migration. Illustrative embodiments calculate the available bandwidth ($A_B$) by deducting the bandwidth allocated for other purposes, such as, for example, application reach back traffic, from the effective bandwidth ($E_B$).

Illustrative embodiments calculate the estimated data replication rate ($E_{RR}$) in terabytes per day (TB/day) with data compression (2:1) using the following equation:

$$(E_{RR})=(A_B \times 3600 \times 24)/1024^2 \times 2,$$

where multiplying available bandwidth ($A_B$), which is in MB/s, by 3600 converts seconds to hours and multiplying that by 24 convert the hours to days, then dividing by $1024^2$ converts MB to TB and multiplying by 2 to account for the data compression. Alternatively, illustrative embodiments can calculate the estimated data replication rate ($E_{RR}$) in TB/day without data compression using the following equation:

$$(E_{RR})=(A_B \times 3600 \times 24)/1024^2.$$

Further, illustrative embodiments calculate a data replication rate override ($RR_O$) based on a proof-of-concept test. The data replication rate override ($RR_O$) is equal to the actual data replication rate value, which illustrative embodiments calculate based on the proof-of-concept test. Illustrative embodiments may utilize, for example, a test server or virtual machine to estimate the efficiency of the data migration link between source and target servers for the proof-of-concept test. When proof-of-concept test results are not available, illustrative embodiments will utilize the estimated data replication rate ($E_{RR}$) value as the data replication rate override ($RR_O$) value.

Furthermore, illustrative embodiments calculate estimated data replication duration based on, for example, server storage capacity, the estimated data replication rate ($E_{RR}$) per day, data change rate, and planned data replication duration. In addition, illustrative embodiments utilize the estimated data replication duration to validate an existing data migration wave plan.

As an illustrative example, assume the server storage capacity is 100 TB, the estimated data replication rate ($E_{RR}$) is 10 TB/day, the data change rate is 5 TB/day, and the planned data replication duration is 30 days (i.e., the number of days between planned data replication start date ($P_{RSD}$) and planned data replication end date ($P_{RED}$)). As a result, in this example, the total storage capacity (i.e., data) to replicate is 100 TB+(5 TB×30), which equals 250 TB, where (5 TB×30) equals 150 TB, which is the total "changed data" for the planned data replication duration. Thus, in this example, the data replication rate per day is 250 TB/30, which equals 8.33 TB/day.

Because the data replication rate per day of 8.33 TB/day is less than the estimated data replication rate ($E_{RR}$) of 10 TB/day for the example above, illustrative embodiments send a status alert (e.g., a green status alert) to a user indicating that the existing data migration wave plan is feasible (i.e., valid). If illustrative embodiments change the planned data replication duration to 10 days in the example above, then the total storage capacity to replicate becomes 100 TB+(5 TB×10), which equals 150 TB. As a result, the data replication rate per day becomes 150 TB/10, which equals 15 TB/day. Because the data replication rate per day is now 15 TB/day, which is more than the estimated data replication rate ($E_{RR}$) of 10 TB/day, illustrative embodiments send a status alert (e.g., a red status alert) to the user indicating that the existing data migration wave plan is not feasible (i.e., invalid).

Further, if illustrative embodiments change the planned data replication duration to 20 days in the example above, then the total storage capacity to replicate becomes 100 TB+(5 TB×20), which equals 200 TB. As a result, the data replication rate per day becomes 200 TB/20, which equals 10 TB/day. Because the data replication rate per day is now 10 TB/day, which is equal to the estimated data replication rate ($E_{RR}$) of 10 TB/day, illustrative embodiments determine that 20 days is the minimum feasible data replication duration. In other words, illustrative embodiments keep changing the planned data replication duration to determine the minimum data replication duration and data migration wave plan feasibility. Thus, illustrative embodiments calculate the minimum data replication duration by adjusting the planned data replication duration (i.e., the time between the planned data replication start date or the planned data replication end date) for each respective data migration event of a set of data migration events in the data migration plan until the data replication rate per day for servers is equal to the estimated data replication rate ($E_{RR}$) per day for the servers. As a result, illustrative embodiments are capable of optimally planning and scheduling a set of data migration events in a data migration wave plan.

Illustrative embodiments utilize the minimum data replication duration ($M_{RD}$) value to generate a new migration wave plan when illustrative embodiments determine that the existing migration wave plan is not feasible. Illustrative embodiments calculate the minimum data replication duration ($M_{RD}$) value based on, for example, the planned data replication start date ($P_{RSD}$), the planned data replication end date ($P_{RED}$), the planned data migration cutover date ($C_D$), the storage capacity of each respective server ($S_C$), the estimated data replication rate ($E_{RR}$) value or the data replication rate override ($RR_O$) value, and the data change rate per day ($D_{CR}$). Illustrative embodiments calculate the minimum data replication duration ($M_{RD}$) value for each respective server in a set of servers per data migration event using the following equation:

$$(M_{RD}) = S_C/E_{RR} + (S_C \times D_{CR})/E_{RR}^2 + (S_C \times D_{CR}^2)/E_{RR}^3 + (S_C \times D_{CR}^3)/E_{RR}^4 + \ldots,$$

where $S_C/E_{RR}$ provides the duration for replicating the existing storage capacity (i.e., data) of a particular server in the set of servers, $(S_C \times D_{CR})/E_{RR}^2$ provides the duration for replicating the "changed data" for an initial data replication duration, $(S_C \times D_{CR}^2)/E_{RR}^3$ provides the duration for replicating the "changed data" for a second data replication duration, $(S_C \times D_{CR}^3)/E_{RR}^4$ provides the duration for replicating the "changed data" for a third data replication duration, and so on. It should be noted that illustrative embodiments repeat this calculation for the minimum data replication duration ($M_{RD}$) until the current data replication duration is less than 1 (i.e., 1 day).

For example, applying this equation to the example above, minimum data replication duration ($M_{RD}$) for a particular server corresponding to a particular migration event equals 100/10+(100/10)×5/10+((100/10)×5/10))×5/10+(((100/10)×5/10)×5/10))×5/10+((((100/10)×5/10)×5/10)×5/10))))×5/10, which equals 10+5+2.5+0.625=19.375. It should be noted that illustrative embodiments continue to perform the calculation until the current data replication duration (0.625 in this example) is less than 1. Thus, illustrative embodiments take into account the data replication duration based on the data change rate of a server storage capacity caused by a set of workloads running on each respective server in the set of servers and available data migration link speed between source and target servers to generate the new data migration wave plan.

As a result, illustrative embodiments increase efficiency of data migration by decreasing an amount of time needed to perform the data migration, optimizing data migration link bandwidth utilization between source and target servers, and increasing computer migration planning and scheduling performance. Illustrative embodiments may be utilized across all types of data migration projects, such as, for example, data migration projects using host-based migrations tools, hypervisor-based migration tools, storage-based migration tools, and the like. Further, illustrative embodiments can scale to any size data migration project. Furthermore, illustrative embodiments can be used for real time data migration planning and scheduling.

Thus, illustrative embodiments provide one or more technical solutions that overcome a technical problem with accurately determining data replication duration and data migration plan feasibility. As a result, these one or more technical solutions provide a technical effect and practical application in the field of data migration.

Figure 5:
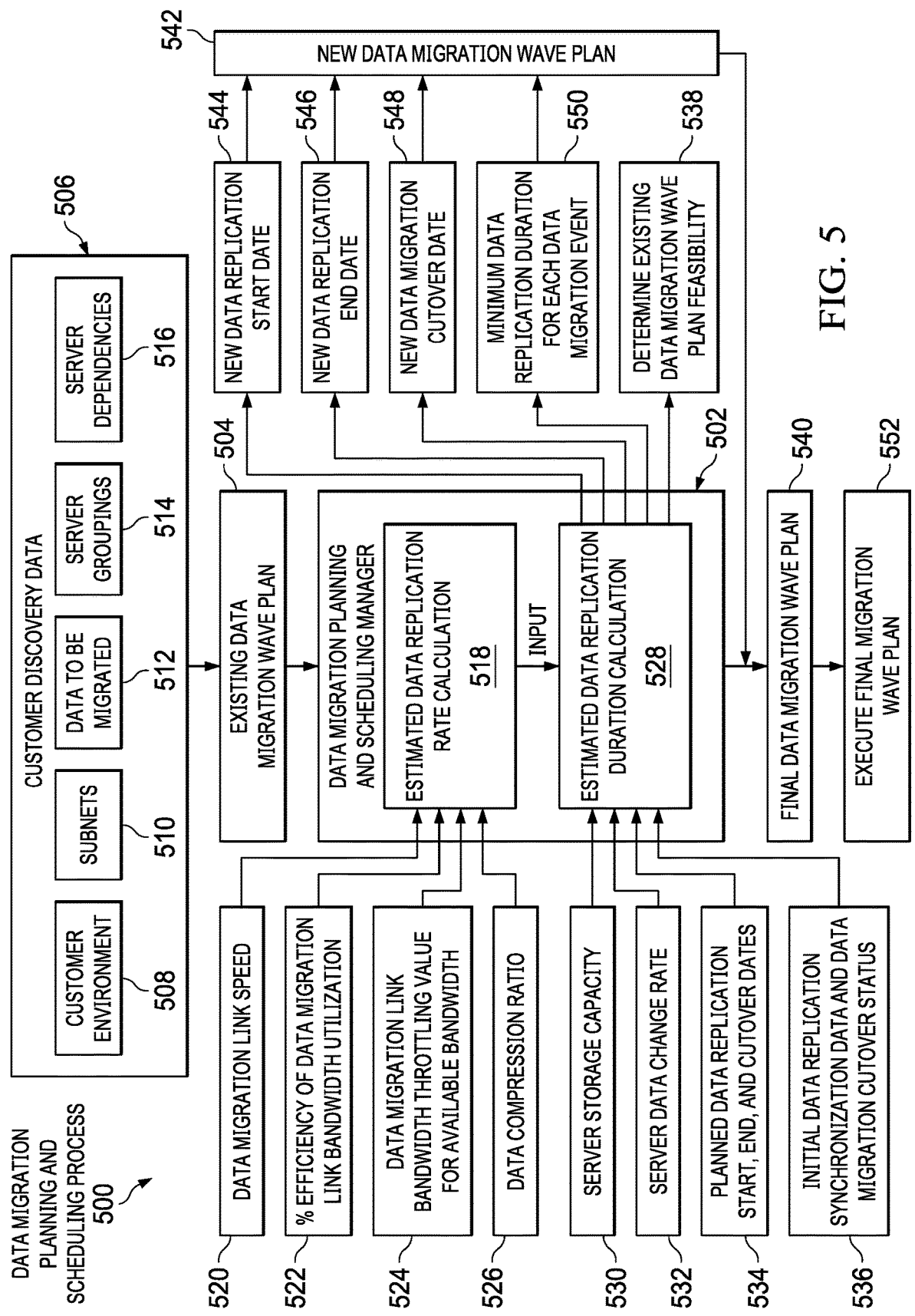
FIG. 5 is a diagram illustrating an example of a data migration planning and scheduling process in accordance with an illustrative embodiment.

With reference now to FIG. 5, a diagram illustrating an example of a data migration planning and scheduling process is depicted in accordance with an illustrative embodiment. Data migration planning and scheduling process 500 is implemented in data migration planning and scheduling manager 502, such as, for example, data migration planning and scheduling manager 218 in FIG. 2.

In this example, data migration planning and scheduling manager 502 receives existing data migration wave plan 504. Existing data migration wave plan 504 corresponds to a customer entity requesting migration of data from one computing environment to another computing environment. Existing data migration wave plan 504 is based on customer discovery data 506. In this example, customer discovery data 506 include customer environment 508, subnets 510, data to be migrated 512, server groupings 514, and server dependencies 516. However, it should be noted that customer discovery data 506 may include any information needed to generate existing data migration wave plan 504.

In response to data migration planning and scheduling manager 502 receiving existing data migration wave plan 504, data migration planning and scheduling manager 502 performs estimated data replication rate calculation 518. Data migration planning and scheduling manager 502 performs estimated data replication rate calculation 518 based on data migration link speed 520, percent efficiency of data migration link bandwidth utilization 522, data migration link bandwidth throttling value for available bandwidth 524, and data compression ratio 526.

After performing estimated data replication rate calculation 518, data migration planning and scheduling manager 502 performs estimated data replication duration calculation 528. Data migration planning and scheduling manager 502 performs estimated data replication duration calculation 528 based on estimated data replication rate calculation 518, server storage capacity 530, server data change rate 532, planned data replication start, end, and cutover dates 534, and initial data replication synchronization data and data migration cutover status 536.

At 538, data migration planning and scheduling manager 502 determines the feasibility of existing data migration wave plan 504 based on estimated data replication duration calculation 528. If data migration planning and scheduling manager 502 determines that existing data migration wave plan 504 is feasible, then data migration planning and scheduling manager 502 utilizes existing data migration wave plan 504 as final data migration wave plan 540. If data migration planning and scheduling manager 502 determines that existing data migration wave plan 504 is not feasible, then data migration planning and scheduling manager 502 generates new data migration wave plan 542 and utilizes new data migration wave plan 542 as final data migration wave plan 540. Data migration planning and scheduling manager 502 generates new data migration wave plan 542 based on new data replication start date 544, new data replication end date 546, new data migration cutover date 548, and minimum data replication duration for each data migration event 550. Subsequently, at 552, data migration planning and scheduling manager 502 executes final data migration wave plan 540 to migrate the customer's data from one computing environment to the other computing environment.

Figure 6:
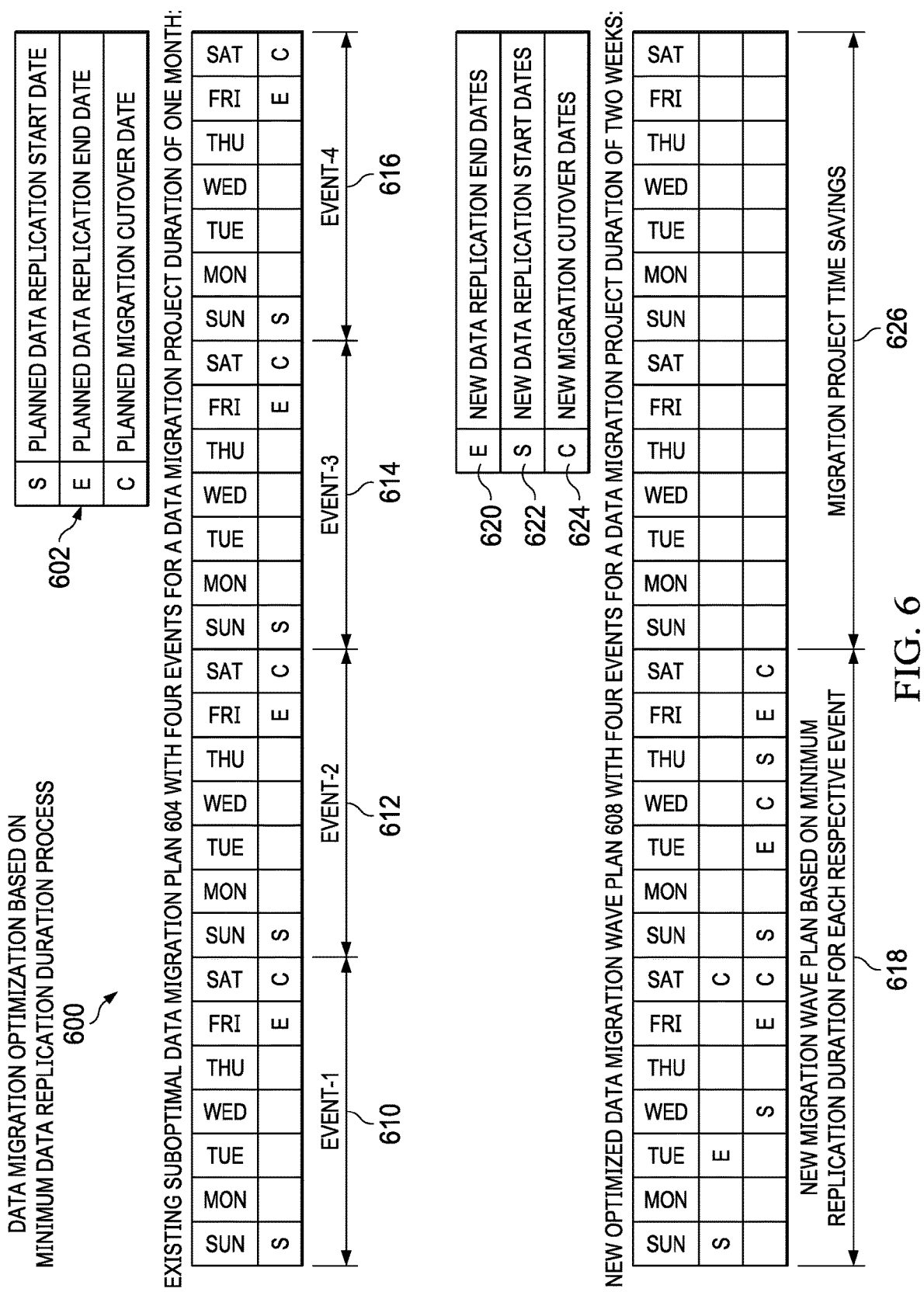
FIG. 6 is a diagram illustrating an example of a data migration optimization based on minimum data replication duration process in accordance with an illustrative embodiment.

With reference now to FIG. 6, a diagram illustrating an example of a data migration optimization based on minimum data replication duration process is depicted in accordance with an illustrative embodiment. Data migration optimization based on minimum data replication duration process 600 may be implemented in a data migration planning and scheduling manager, such as, for example, data migration planning and scheduling manager 502 in FIG. 5.

In this example, data migration optimization based on minimum data replication duration process 600 includes legend 602, existing suboptimal data migration plan 604 and new optimized data migration wave plan 608. Legend 602 specifies that "S" in the diagram means "Planned Data Migration Start Date", "E" means "Planned Data Migration End Date", and "C" means Planned Migration Cutover Date". Existing suboptimal data migration plan 604 comprises four events for a data migration project duration of one month (i.e., four weeks, where one week is Sunday through Saturday). For example, existing suboptimal data migration plan 604 includes event-1 610, event-2 612, event-3 614, and event-4 616 sequentially over a four-week period, each data migration event having a duration of one week (i.e., Sunday through Saturday).

However, because the data migration planning and scheduling manager determines that existing suboptimal data migration plan 604 is not feasible based on an estimated data replication duration calculation, such as, for example, estimated data replication duration calculation 528 in FIG. 5, the data migration planning and scheduling manager generates new optimized data migration wave plan 608. New optimized data migration wave plan 608 comprises the same four data migration events as existing suboptimal data migration plan 604, but with a data migration project duration of only two weeks. The data migration planning and scheduling manager generates new optimized data migration wave plan 608 based on minimum data replication duration for each respective data migration event 618, such as, for example, minimum data replication duration for each data migration event 550 in FIG. 5. The data migration planning and scheduling manager determines new data replication end dates 620, new data replication start dates 622, and new data migration cutover dates 624 for new optimized data migration wave plan 608 based on minimum data replication duration for each respective data migration event 618. As a result, the data migration planning and scheduling manager is able to produce data migration project time savings 626 of two weeks over existing suboptimal data migration plan 604.

Figure 7:
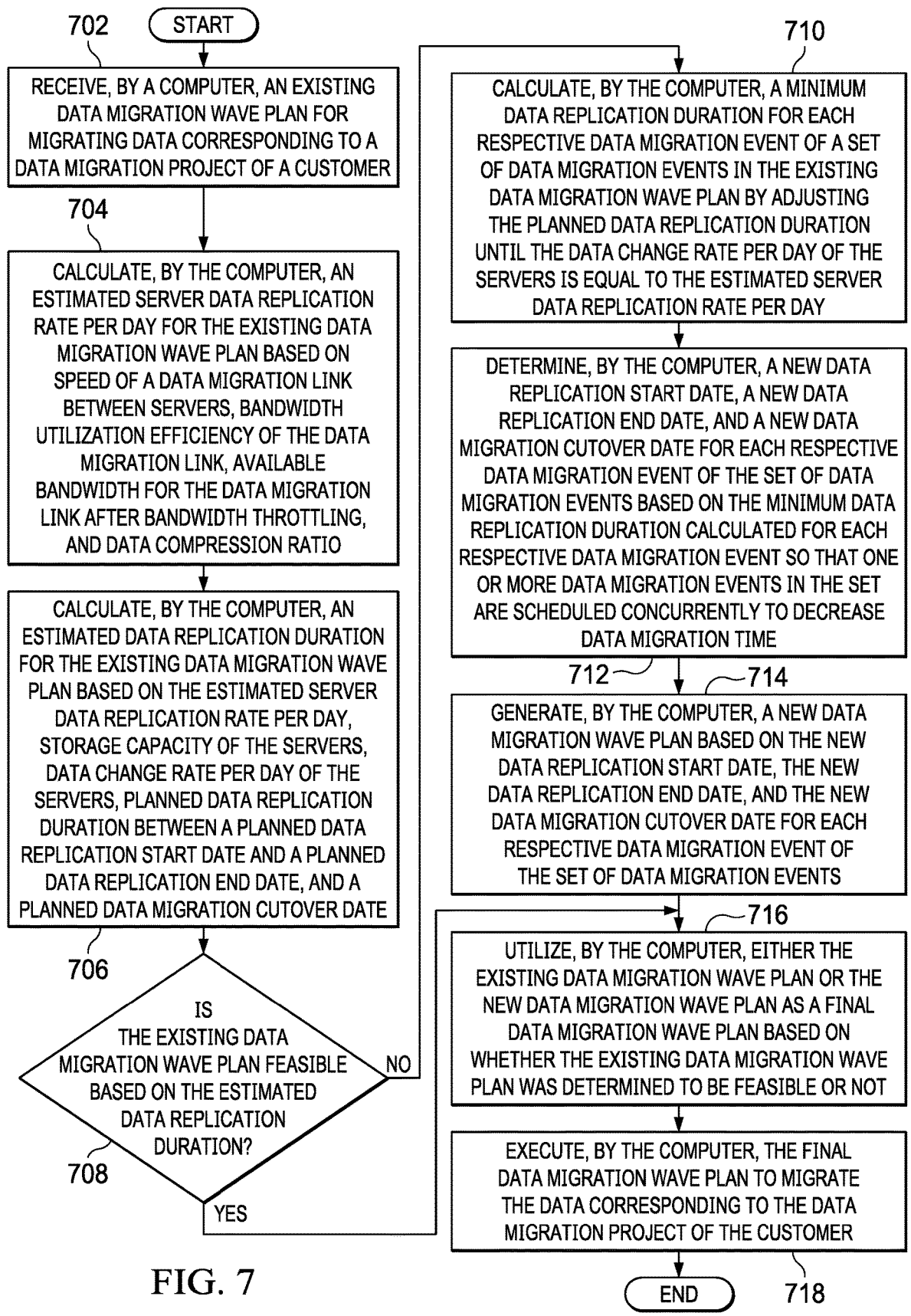
FIG. 7 is a flowchart illustrating a process for migrating data based on data change rate analysis in accordance with an illustrative embodiment.

With reference now to FIG. 7, a flowchart illustrating a process for migrating data based on data change rate analysis is shown in accordance with an illustrative embodiment. The process shown in FIG. 7 may be implemented in a computer, such as, for example, server 104 in FIG. 1 or data processing system 200 in FIG. 2. For example, the process shown in FIG. 7 may be implemented in data migration planning and scheduling manager 218 in FIG. 2.

The process begins when the computer receives an existing data migration wave plan for migrating data corresponding to a data migration project of a customer (step 702). The customer data migration project may be, for example, migrating data from one datacenter to another datacenter, migrating data from a datacenter to a cloud environment, migrating data from one cloud environment to another cloud environment, or the like. The data to be migrated may be, for example, server images.

In response to receiving the existing data migration wave plan, the computer calculates an estimated server data replication rate per day for the existing data migration wave plan based on speed of a data migration link between servers, bandwidth utilization efficiency of the data migration link, available bandwidth for the data migration link after bandwidth throttling, and data compression ratio (step 704). In addition, the computer calculates an estimated data replication duration for the existing data migration wave plan based on the estimated server data replication rate per day, storage capacity of the servers, data change rate per day of the servers, planned data replication duration between a planned data replication start date and a planned data replication end date, and a planned data migration cutover date (step 706).

Subsequently, the computer makes a determination as to whether the existing data migration wave plan is feasible based on the estimated data replication duration (step 708). If the computer determines that the existing data migration wave plan is feasible based on the estimated data replication duration, yes output of step 708, then the process proceeds to step 716. If the computer determines that the existing data migration wave plan is not feasible based on the estimated data replication duration, no output of step 708, then the computer calculates a minimum data replication duration for each respective data migration event of a set of data migration events in the existing data migration wave plan by adjusting the planned data replication duration until the data change rate per day of the servers is equal to the estimated server data replication rate per day (step 710).

Afterward, the computer determines a new data replication start date, a new data replication end date, and a new data migration cutover date for each respective data migration event of the set of data migration events based on the minimum data replication duration calculated for each respective data migration event so that one or more data migration events in the set are scheduled concurrently to decrease data migration time for the data migration project (step 712). Further, the computer generates a new data migration wave plan based on the new data replication start date, the new data replication end date, and the new data migration cutover date for each respective data migration event of the set of data migration events corresponding to the data migration project (step 714).

The computer utilizes either the existing data migration wave plan or the new data migration wave plan as a final data migration wave plan based on whether the existing data migration wave plan was determined to be feasible or not (step 716). Moreover, the computer executes the final data migration wave plan to migrate the data corresponding to the data migration project of the customer (step 718). Thereafter, the process terminates.

Thus, illustrative embodiments of the present invention provide a computer-implemented method, computer system, and computer program product for planning and scheduling data migration based on analyzing the data change rate of each respective server in a set of servers corresponding to a data migration event of a set of data migration events in an entire data migration wave plan. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for data migration based on data change rate analysis, the computer-implemented method comprising:

determining, by the computer, whether an existing data migration wave plan corresponding to a data migration project is feasible based on an estimated data replication duration;

calculating, by the computer, an estimated server data replication rate per day for the existing data migration wave plan;

responsive to the computer determining that the existing data migration wave plan is not feasible, calculating, by a computer, a minimum data replication duration for each respective data migration event of a set of data migration events in the existing data migration wave plan by adjusting a planned data replication duration until a data change rate per day of servers is equal to the estimated server data replication rate per day;

determining, by the computer, a new data replication start date, a new data replication end date, and a new data migration cutover date for each respective data migration event of the set of data migration events based on the minimum data replication duration calculated for each respective data migration event so that one or more data migration events in the set of data migration events are scheduled concurrently to decrease data migration time for the data migration project; and generating, by the computer, a new data migration wave plan based on the new data replication start date, the new data replication end date, and the new data migration cutover date for each respective data migration event of the set of data migration events corresponding to the data migration project.

2. The computer-implemented method of claim 1 further comprising:

utilizing, by the computer, the new data migration wave plan as a final data migration wave plan based on the computer determining that the existing data migration wave plan is not feasible; and executing, by the computer, the final data migration wave plan to migrate data corresponding to the data migration project.

3. The computer-implemented method of claim 1 further comprising:

receiving, by the computer, the existing data migration wave plan for migrating data corresponding to the data migration project; and wherein calculating the estimated server data replication rate per day for the existing data migration wave plan is based on speed of a data migration link between servers, bandwidth utilization efficiency of the data migration link, available bandwidth for the data migration link after bandwidth throttling, and data compression ratio.

4. The computer-implemented method of claim 3 further comprising:

calculating, by the computer, the estimated data replication duration for the existing data migration wave plan based on the estimated server data replication rate per day, storage capacity of the servers, data change rate per day of the servers, planned data replication duration, and planned data migration cutover date.

5. The computer-implemented method of claim 4 further comprising:

responsive to the computer determining that the existing data migration wave plan is feasible based on the estimated data replication duration, utilizing, by the computer, the existing data migration wave plan as a final data migration wave plan.

6. The computer-implemented method of claim 1, wherein the data change rate per day of a storage capacity of each respective server is caused by a set of workloads running on each respective server.

7. The computer-implemented method of claim 1, wherein the data migration project is one of a datacenter-to-datacenter data migration project, a datacenter-to-cloud environment data migration project, or a cloud environment-to-cloud environment data migration project.

8. A computer system for data migration based on data change rate analysis, the computer system comprising:

a bus system;

a storage device connected to the bus system, wherein the storage device stores program instructions; and a processor connected to the bus system, wherein the processor executes the program instructions to:

determine whether an existing data migration wave plan corresponding to a data migration project is feasible based on an estimated data replication duration;

calculate an estimated server data replication rate per day for the existing data migration wave plan;

responsive to the computer determining that the existing data migration wave plan is not feasible, calculate a minimum data replication duration for each respective data migration event of a set of data migration events in the existing data migration wave plan by adjusting a planned data replication duration until a data change rate per day of servers is equal to an estimated server data replication rate per day;

determine a new data replication start date, a new data replication end date, and a new data migration cutover date for each respective data migration event of the set of data migration events based on the minimum data replication duration calculated for each respective data migration event so that one or more data migration events in the set of data migration events are scheduled concurrently to decrease data migration time for the data migration project; and generate a new data migration wave plan based on the new data replication start date, the new data replication end date, and the new data migration cutover date for each respective data migration event of the set of data migration events corresponding to the data migration project.

9. The computer system of claim 8, wherein the processor further executes the program instructions to:

utilize the new data migration wave plan as a final data migration wave plan based on determining that the existing data migration wave plan is not feasible; and execute the final data migration wave plan to migrate data corresponding to the data migration project.

10. The computer system of claim 8, wherein the processor further executes the program instructions to:

receive the existing data migration wave plan for migrating data corresponding to the data migration project; and wherein calculating the estimated server data replication rate per day for the existing data migration wave plan based on speed of a data migration link between servers, bandwidth utilization efficiency of the data migration link, available bandwidth for the data migration link after bandwidth throttling, and data compression ratio.

11. The computer system of claim 10, wherein the processor further executes the program instructions to:

calculate the estimated data replication duration for the existing data migration wave plan based on the estimated server data replication rate per day, storage capacity of the servers, data change rate per day of the servers, planned data replication duration, and planned data migration cutover date.

12. The computer system of claim 11, wherein the processor further executes the program instructions to:
utilize the existing data migration wave plan as a final data migration wave plan in response to determining that the existing data migration wave plan is feasible based on the estimated data replication duration.

13. The computer system of claim 8, wherein the data change rate per day of a storage capacity of each respective server is caused by a set of workloads running on each respective server.

14. A computer program product for data migration based on data change rate analysis, the computer program product comprising a computer readable storage medium having program instructions embodied therewith, the program instructions executable by a computer to cause the computer to perform a method of:
determining, by the computer, whether an existing data migration wave plan corresponding to a data migration project is feasible based on an estimated data replication duration;
calculating, by the computer, an estimated server data replication rate per day for an existing data migration wave plan;
responsive to the computer determining that the existing data migration wave plan is not feasible, calculating, by the computer, a minimum data replication duration for each respective data migration event of a set of data migration events in an existing data migration wave plan by adjusting a planned data replication duration until a data change rate per day of servers is equal to an estimated server data replication rate per day;
determining, by the computer, a new data replication start date, a new data replication end date, and a new data migration cutover date for each respective data migration event of the set of data migration events based on the minimum data replication duration calculated for each respective data migration event so that one or more data migration events in the set of data migration events are scheduled concurrently to decrease data migration time for the data migration project; and
generating, by the computer, a new data migration wave plan based on the new data replication start date, the new data replication end date, and the new data migration cutover date for each respective data migration event of the set of data migration events corresponding to the data migration project.

15. The computer program product of claim 14 further comprising:
utilizing, by the computer, the new data migration wave plan as a final data migration wave plan based on the computer determining that the existing data migration wave plan is not feasible; and
executing, by the computer, the final data migration wave plan to migrate data corresponding to the data migration project.

16. The computer program product of claim 14 further comprising:
receiving, by the computer, the existing data migration wave plan for migrating data corresponding to the data migration project; and
wherein calculating the estimated server data replication rate per day for the existing data migration wave plan based on speed of a data migration link between servers, bandwidth utilization efficiency of the data migration link, available bandwidth for the data migration link after bandwidth throttling, and data compression ratio.

17. The computer program product of claim 16 further comprising:
calculating, by the computer, the estimated data replication duration for the existing data migration wave plan based on the estimated server data replication rate per day, storage capacity of the servers, data change rate per day of the servers, planned data replication duration, and planned data migration cutover date.

18. The computer program product of claim 17 further comprising:
responsive to the computer determining that the existing data migration wave plan is feasible based on the estimated data replication duration, utilizing, by the computer, the existing data migration wave plan as a final data migration wave plan.

19. The computer program product of claim 14, wherein the data change rate per day of a storage capacity of each respective server is caused by a set of workloads running on each respective server.

20. The computer program product of claim 14, wherein the data migration project is one of a datacenter-to-datacenter data migration project, a datacenter-to-cloud environment data migration project, or a cloud environment-to-cloud environment data migration project.

* * * * *